United States Patent [19]

Kinney

[11] 4,130,335

[45] Dec. 19, 1978

[54] ELECTRICAL WIRING BOX

[75] Inventor: David W. Kinney, Parkersburg, W. Va.

[73] Assignee: Union Insulating Company, Parkersburg, W. Va.

[21] Appl. No.: 834,112

[22] Filed: Sep. 19, 1977

Related U.S. Application Data

[63] Continuation of Ser. No. 712,514, Aug. 9, 1976, abandoned.

[51] Int. Cl.$^2$ ............................................. H02G 3/16
[52] U.S. Cl. .................................... 339/122 R; 85/85; 220/3.2
[58] Field of Search .................. 339/122; 220/3.5, 3.9, 220/3.2; 85/85

[56] References Cited

U.S. PATENT DOCUMENTS

| | | | |
|---|---|---|---|
| 2,720,135 | 10/1955 | Gisondi | 85/85 |
| 3,895,732 | 7/1975 | Robinson | 220/3.5 |

Primary Examiner—Howard N. Goldberg
Assistant Examiner—E. F. Desmond
Attorney, Agent, or Firm—Peter Xiarhos

[57] ABSTRACT

An electrical wiring box having a pair of factory-installed mounting elements associated therewith for permitting the quick and easy mounting of an electrical device within the wiring box. The wiring box includes bosses each having a generally-rectangular opening countersunk therein for receiving a corresponding mounting element. Each of the mounting elements includes a central portion having a screw-receiving opening and a pair of abutment edge portions adjacent to the opening, a pair of spaced-apart side portions integral with the central portion, and a pair of deflectible thread-engaging portions integral with the side portions and including pairs of retention wing portions at the terminations thereof. When inserted into their associated openings, the edge portions of the central portions of the mounting elements abut against shoulders adjacent to the openings, thereby limiting the forward entry of the mounting elements into the openings, and the retention wing portions are positioned externally at the back ends of the openings in a manner so as to prevent removal of the mounting elements from the openings.

An electrical device is mounted within the wiring box in a field installation by simply inserting associated screws into the screw-receiving openings of the central portions of the mounting elements and pushing the screws into the regions between the thread engaging portions of the mounting elements. As a result, the thread-engaging portions are caused to be deflected outwardly and, after the screws have been driven completely home, the thread-engaging portions come to rest in different regions between threads of the screws, thereby firmly gripping onto the screws. The outward deflection of the thread-engaging portions by the screws further causes the mounting elements to be more completely fixed within their associated openings.

13 Claims, 6 Drawing Figures

ELECTRICAL WIRING BOX

This is a continuation, of application Ser. No. 712,514 filed Aug. 9, 1976, now abandoned.

BACKGROUND OF THE INVENTION

The present invention relates to an electrical wiring box and, more particularly, to an electrical wiring box having factory-installed mounting elements associated therewith for permitting the quick and easy mounting of an electrical device within the wiring box in a field installation.

At the present time electrical devices such as receptacles and switches are most commonly mounted within electrical wiring boxes by means of screws associated with the electrical devices and threaded into openings provided in ears or bosses of the wiring boxes. Since the screws are usually of fine pitch and of considerable length, to accommodate several possible thicknesses of wallboard or panelling, considerable time is required to completely thread a pair of the screws into the tabs or bosses of a wiring box to tightly secure an electrical device to the wiring box. As a result, and in the interest of reducing escalating labor costs, it has been found highly desirable to reduce the time and effort required to mount electrical devices within wiring boxes.

Numerous attempts have been made and several proposals offered directed to a solution to the above-stated problem. By way of example, in U.S. Pat. No. 3,403,214, there is described an electrical device (receptacle or switch) having a strap portion associated therewith and a pair of fasteners used in conjunction with openings in the strap portion for mounting the electrical device to a pair of mounting ears of an electrical wiring box. One of the fasteners is a conventional mounting screw adapted to be inserted into a first opening in the strap portion of the electrical device and to be threaded into a threaded opening of one of the ears of the wiring box, and the other fastener is a special elongated serrated member extending normally from the strap portion and adapted to be freely inserted into a threaded opening of the other ear of the wiring box. To mount the electrical device to the wiring box, the special serrated fastener is first freely inserted completely within the opening of the associated ear and the mounting screw is then threaded into the threaded opening of its associated ear. As the mounting screw is threaded into its associated ear opening, a part of the strap portion of the electrical device physically coacts with the mounting screw and causes the electrical device to move along a longitudinal axis thereof to cause the serrations of the serrated fastener to move into physical contact with and firmly engage the threads of its associated ear opening. As a result, the electrical device is attached to the wiring box. Variations and modifications of the above-described arrangement, utilizing electrical devices having specially-modified strap portions and special serrated or threaded fasteners, are also described in U.S. Pat. Nos. 3,403,215 and 3,403,216. Further, in U.S. Pat. No. 3,403,218, there is described a mounting arrangement utilizing an electrical device having a specially-modified strap portion and a pair of special eccentric mounting screws, the latter screws being freely and fully insertable within threaded openings in associated ears and then capable of rotation to cause the threads thereof to move into physical contact with and engage the threads of the associated threaded ear openings.

Still other solutions to the aforedescribed problem are described in U.S. Pat. Nos. 3,526,703, 3,876,821 and 3,895,732. In U.S. Pat. No. 3,526,703, a mounting arrangement is described which includes a pair of side-by-side mounting lugs mounted for pivotal movement on each of two opposing walls of a wiring box. The mounting lugs of each pair of lugs have adjacent threaded concavities cooperating to define an internally-threaded opening for threadably receiving therein an associated screw for mounting an electrical device to the wiring box. To mount the electrical device to the wiring box, a pair of screws are first pushed for essentially their full length through the openings defined in the pairs of lugs. This pushing action causes the lugs of each pair to move away from each other. The screws are then tightened for a few turns as a result of which the lugs of each pair move back toward each other to provide securement of the electrical device to the wiring box.

In U.S. Pat. No. 3,876,821, a mounting arrangement is described which includes a pair of insert members, each fixedly disposed within a corresponding opening or channel in a boss of a wiring box and each having a thread-engaging tab portion adapted to physically engage a region between adjacent threads of a screw following the insertion of the screw into the opening. To mount an electrical device to the wiring box, the screws associated with the electrical device are pushed into the openings in the bosses of the wiring box, causing the thread-engaging tab portions of the insert members to deflect outwardly slightly as the screws pass into the openings. When the screws have been pushed completely into the openings, the thread-engaging tab portions fall between and come to rest between adjacent threads of the screws, thereby mounting the electrical device within the wiring box.

In U.S. Pat. No. 3,895,732, a mounting arrangement is described which includes a pair of generally triangular-shaped screw-retaining clips which are arranged to be inserted into corresponding generally triangular-shaped openings in a wiring box. Each of the clips has a plurality of tines for physically cutting or biting into the walls of the corresponding opening of the wiring box, thereby to secure the clip to the wiring box, and each of the clips has a plurality of thread-engaging flanges or tips disposed within the associated opening for engaging a screw inserted into a central region of the clip. To mount an electrical device within the wiring box, the screws associated with the electrical device are pushed into the central regions of the screw retaining clips, causing the thread-engaging flanges to deflect outwardly slightly as the screws pass into the central regions. When the screws have been inserted completely into the central regions of the clips, the thread-engaging flanges fall between and come to rest in different regions between threads of the screws thereby gripping onto the screws.

While the mounting arrangements of the aforedescribed patents appear to represent reasonable solutions to the problem of mounting electrical devices within wiring boxes, these mounting arrangements have a number of disadvantages associated therewith. Specifically, in the case of U.S. Pat. Nos. 3,403,214; 3,403,215; 3,403,216 and 3,403,218, the mounting arrangements described therein require specially-modified electrical devices (strap portions) and special fasteners (serrated mounting members and mounting screws), all of which are difficult and costly to manufacture. In the case of U.S. Pat. No. 3,526,703, the mounting arrangement described therein, utilizing two pairs of pivoting lugs mounted to a wiring box and each having a threaded concavity therein, is also difficult and costly to manufacture, particularly on a mass-production, volume basis, and especially if the wiring box with which the mounting arrangement is to be used is of a molded plastic composition. In the case of U.S. Pat. No. 3,876,821, the insert members may be rendered inoperative if particles of plasterboard, drywall or other material get into an insert member and/or the threads of a mounting screw and prevent the thread-engaging tab portion of the insert member from engaging the region between adjacent threads of the mounting screw. In this situation, the thread-engaging tab portion of the insert member, rather than engaging a region between adjacent threads of the screw, may instead ride on the rim of a thread of the screw, leading to the possible undesirable removal of the screw from the insert member and, thus, the possible loosening or, even worse, the withdrawal of the electrical device from the wiring box. The insert members of U.S. Pat. No. 3,876,821 further require means other than the thread-engaging tab portions themselves, for example, locking tabs cooperating with shoulders or abutments within the openings, for retaining the insert members in position, thereby further complicating the design of the insert members and the wiring box itself. In the case of U.S. Pat. No. 3,895,732, the retention of the screw-retaining clips in the openings in the wiring box is accomplished entirely by the physical cutting or biting effects of the small tines of the clips. While this type of biting action may be suitable for "soft" (e.g., thermoplastic) plastic boxes, it cannot, by itself, practicably be achieved with "hard", brittle (e.g., thermosetting) plastic boxes. Further, the movement of the thread-engaging flanges in a direction generally transverse to the axes of the openings is very limited, by virtue of the fact that the portions of the clips supporting the thread-engaging flanges are physically confined within the openings, requiring substantial force to be applied to the screws to spread the thread-engaging flanges apart sufficiently to easily and readily receive the screws.

BRIEF SUMMARY OF THE INVENTION

In accordance with the present invention, a box arrangement is provided which avoids the problems and disadvantages of prior art arrangements as described hereinabove. The box arrangement in accordance with the invention includes a box having a plurality of walls arranged to define a space for receiving a device, and a mounting element disposed within a longitudinal opening in the box. The box further has a pair of abutment portions adjacent to opposite sides of the opening.

The mounting element in accordance with the invention comprises a central portion, first and second spaced-apart side portions, and first and second deflectible portions. The central portion of the mounting element is adjacent to the front of the opening in the box and has a portion in abutment with a portion of the box adjacent to the opening. The central portion further has an opening associated therewith through which a threaded screw may be inserted into the mounting element. The first and second side portions of the mounting element are connected with the central portion on opposite sides of the opening associated with the central portion and extend along the opening in the box. The first and second deflectible portions are respectively connected with the first and second side portions and have first and second retention portions respectively associated therewith adjacent to the abutment portions of the box. The deflectible portions further have threads provided along inner surfaces thereof and define a screw-receiving region therebetween. The deflectible portions are operative when a screw has been inserted into the mounting element in the screw-receiving region between the deflectible portions to be deflected outwardly in opposite directions away from the axis of the opening in the box and to cause the retention portions associated therewith to be positioned with respect to the abutment portions of the box so as to fix the mounting element in position in the opening in the box and prevent removal of the mounting element from the opening in the box. The threads along the inner surfaces of the deflectible portions are operative to engage threads of the screw when the screw has been completely inserted within the mounting element.

BRIEF DESCRIPTION OF THE DRAWING

Various objects, features and advantages of an electrical wiring box in accordance with the present invention will be apparent from the following detailed description taken in conjunction with the accompanying drawing in which.

DETAILED DESCRIPTION OF THE INVENTION

Figure 1:
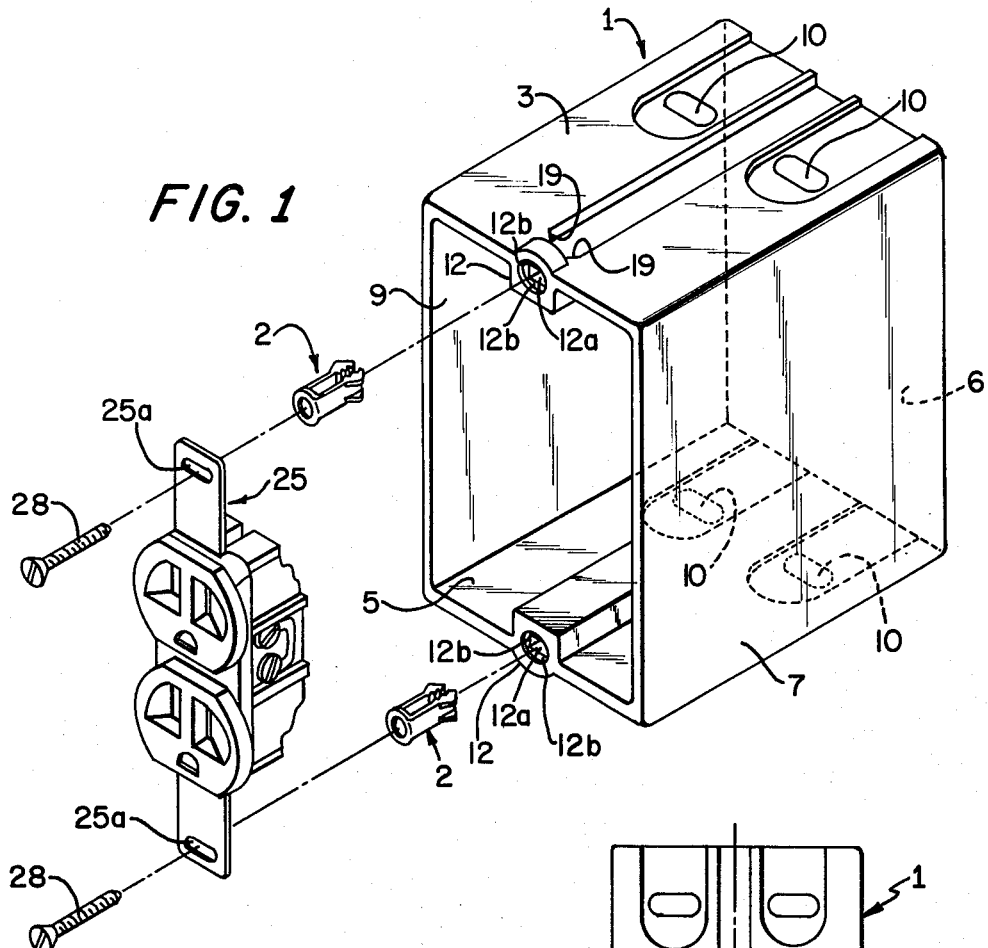
FIG. 1 is an exploded view illustrating an electrical wiring box used in conjunction with a pair of mounting elements in accordance with the present invention for mounting an electrical device within the electrical wiring box.
Figure 2:
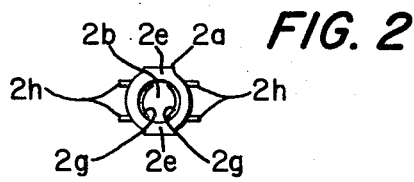
FIGS. 2, 3, and 4 are front, top and side views, respectively, of a mounting element as adapted to be used with the wiring box in accordance with the invention.
Figures 3, 4:
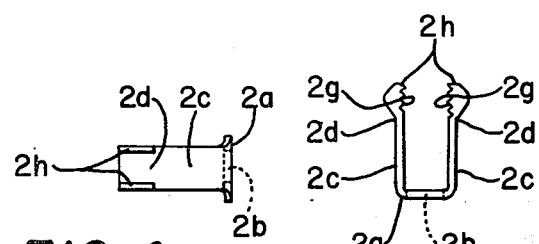

Referring now to FIG. 1, there is shown in an exploded view an arrangement including an electrical wiring box 1 as employed in accordance with the present invention with a pair of mounting elements 2 to mount an electrical device 25 within the wiring box 1. As shown in FIG. 1, the electrical wiring box 1 includes a top wall 3, a bottom wall 5, a rear wall 6, and a pair of side walls 7 and 9. These walls define an opening at the front of the wiring box 1 and further enclose a space or volume for receiving an electrical device such as an electrical switch or receptacle as well as wires and other electrical connections associated with the electrical device. The top and bottom walls 3 and 5 further include knockout elements 10 which may be removed selectively as desired for the entrance of wire cables to make electrical connections to an electrical device which is to be mounted within the wiring box 1. Although not shown in FIG. 1, means are normally provided for the wiring box 1 for attaching the wiring box 1 to a supporting structure such as a wood stud.

Figure 5:
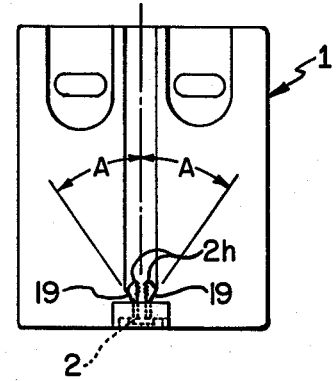
FIG. 5 is a top view of the electrical wiring box shown in FIG. 1 as assembled together with the mounting elements in accordance with the invention.

The wiring box 1 further includes a pair of bosses 12 formed integrally with the top and bottom walls 3 and 5 of the wiring box 1. The bosses 12 have generally rectangular-shaped longitudinal openings 12a countersunk therein with the material of the box 1 adjacent to the horizontal dimensions of the openings 12a representing shoulders 12b. The purpose of the shoulders 12b will be explained in detail hereinafter. The wiring box 1 further includes portions 19, best shown in FIG. 5, adjacent to the rear of the openings 12a having abutment surfaces 19a at acute angles with respect to the central axes of the openings 12a. The purpose of the portions 19 will also be explained in detail hereinafter. A typical value for the angles of the abutment surfaces 19a, shown at "A" in FIG. 5, is 35°.

An electrical device is mounted within the wiring box 1 by use of the aforementioned mounting elements 2, each of which is factory installed within a corresponding one of the openings 12a in the general manner as indicated in FIG. 1. As shown in FIGS. 1–4, each of the mounting elements 2, typically of stamped sheet metal, includes a central portion 2a having a generally-circular opening 2b therein, a pair of slightly-converging spaced-apart side portions 2c integral with the central portion 2a, and a pair of spaced-apart deflectible thread-engaging portions 2d integral with the side portions 2c and terminated by pairs of generally V-shaped retaining wing portins 2h. The opening 2b in the central portion 2a of the member 2 is a screw-receiving opening having a diameter greater than the diameter of the threaded portion of a screw and is employed, together with the side portions 2c, to receive and guide a standard metal or plastic screw into and along the corresponding mounting element 2 at such time as an electrical device is to be mounted within the wiring box 1, as will be explained in greater detail hereinafter. The opening 2b further defines a pair of opposed edge portions 2e which, when the mounting element 2 is inserted into a corresponding one of the openings 12a, abut against the shoulders 12b adjacent to the opening 12a and limit the forward entry or penetration of the element 2 into the opening 12a.

The abovementioned thread-engaging portions 2d have a plurality of threads 2g formed along inner surfaces thereof for engaging and gripping onto the threads of a standard metal or plastic machine screw during the attachment of an electrical device to the wiring box 1, as will be explained hereinafter. The threads 2g may be formed by a simple stamping operation.

The mounting elements 2 as described hereinabove are fixed within the openings 12a of the wiring box 1, specifically during a factory assembly operation, by first squeezing the side portions 2c together slightly, to allow the elements 2 to be readily inserted into the openings 12a, and then pushing the elements into the openings 12a until the retaining wing portions 2h re-emerge and spring outwardly slightly at the rear of the openings 12a. Alternatively, the openings 12a may be tapered, thereby automatically causing the side portions 2c to be squeezed together during the insertion of the elements 2 into the openings 12a. In either case, as the retaining wing portions 2h re-emerge at the rear of the openings 12a, the edge portions 2e of the central portions 2a abut against the shoulders 12b adjacent to the openings 12a, thereby limiting the forward entry of the elements 2 into the openings 12a, and the retaining wing portions 2h are positioned closely adjacent to and may touch the angled surfaces 19a (FIG. 5) of the abutment portions 19 of the box 1. This latter positioning, or outward flaring of the retaining wing portions 2h, which is best shown in FIG. 5, serves to retain the elements 2 within the openings 12a so that they cannot be easily removed from the openings 12a by attempts to pull the elements 2 longitudinally out from the openings 12a.

Figure 6:
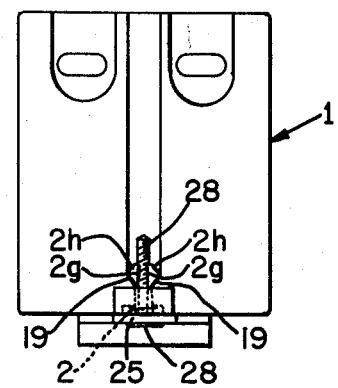
FIG. 6 is a top view of the electrical wiring box shown in FIG. 1 as assembled together with the mounting elements, a pair of screws, and an electrical device in accordance with the invention.

To field-install an electrical device within the above-described wiring box 1, for example, an electrical device 25 in the form of a duplex receptacle as shown in FIGS. 1 and 6, it is only required that a pair of screws 28 be inserted by the installer through a corresponding pair of standard openings 25a in the electrical device 25 and then pushed through the openings 2b in the central portions 2a of the mounting members 2 and along the side portions 2c toward the region between the thread-engaging portions 2d. As the screws 28 are pushed into the region between the thread-engaging portions 2d, the screws 28 force or deflect the portions 2d outwardly, causing the threads 2g of the portions 2d to ride on the outer surfaces or rims of the threads of the screws 28. When each of the screws 28 has been pushed completely home, the threads 2g of the portions 2d come to rest in regions, or valleys, between threads of the screw 28, thereby gripping the screw 28 in several different places and firmly holding the screw 28 in position. The above operation also has the effect of forcing the retaining wing portions 2h further outwardly from their initial positions into either very close or direct physical contact with the surfaces 19a of the portions 19 of the wiring box 1, thereby further fixing or retaining the mounting element 2 within the corresponding opening 12a. Further, by virtue of the fact that the mounting element 2 has a generally-rectangular configuration and the opening 12a is generally rectangular, it is impossible for the mounting element 2 to be twisted out of the opening 12a, thereby insuring that the mounting element 2 is not removed from the opening, for example, during removal of the screw 28 from the mounting element 2. Removal of the screw 28 is accomplished, if desired, by unthreading or backing off the screw 28 in the usual manner with a tool such as a screwdriver.

It will now be apparent that a wiring box has been described utilizing mounting elements which are of very simple design and low cost, and easily and readily installed within the openings 12a in the wiring box 1 in a simple factory operation and then used in the field with standard metal or plastic machine screws. The central portions 2a of the mounting elements 2, by virtue of the provision of the openings 2b and the edge portions 2e, serve the dual functions of receiving and guiding (together with the side portions 2c) screws into the mounting elements 2 and limiting the forward entry of the elements 2 into the openings 12a. The thread-engaging portions 2d, by virtue of being deflectible and having retaining wing portions 2h extending outwardly at the rear of the openings 12a, serve the dual function of fixing or locking the mounting elements 2 within the openings 12a, both before and after screws have been used in conjunction with the elements 2, and firmly gripping onto the screws when inserted into the elements 2. No tines or barbs for biting into the wiring box or locking elements positioned within the openings 12a, as commonly used in the prior art, are required by the present invention.

While there has been described what is considered to be a preferred embodiment of the invention, it will be obvious to those skilled in the art that various changes and modifications may be made therein without departing from the invention as called for in the appended claims.

What is claimed is:

1. A box arrangement comprising:

a box including a plurality of walls arranged to define a space for receiving a device, said box having a longitudinal opening therein in which a mounting element is disposed and further having a pair of abutment portions adjacent to opposite sides of the opening;

said mounting element comprising:

a central portion adjacent to the front of the opening in the box and having a portion in abutment with a portion of the box adjacent to the opening, said central portion having an opening associated therewith by which a threaded screw may be inserted into the mounting element, said opening in the central portion being of a size to permit a screw to be freely and readily inserted into the mounting element without the central portion interfering with the forward progress of the screw or gripping onto the screw;

first and second spaced-apart side portions connected with the central portion on opposite sides of the opening associated with the central portion and extending along the opening in the box, said side portions being spaced apart to define an unobstructed region therebetween for allowing a screw inserted into the mounting element and pushed longitudinally through the region between the side portions to pass continuously and unobstructively through the region without the side portions engaging the screw; and first and second deflectible portions respectively connected with the first and second side portions and having first and second retention portions respectively associated therewith adjacent to the abutment portions of the box, said deflectible portions having threads provided along inner surfaces thereof and defining a screw-receiving region therebetween, said deflectible portions being operative when a screw is inserted and pushed longitudinally into the mounting element through the region between the side portions and into the screw-receiving region between the deflectible portions to be deflected outwardly in opposite directions away from the axis of the opening in the box and to cause the retention portions associated therewith to be positioned with respect to the abutment portions of the box so as to fix the mounting element in position in the opening in the box and prevent removal of the mounting element from the opening in the box, and the threads along the inner surfaces of the deflectible portions being operative when the screw is pushed into the screw-receiving region to ride along the rims of the threads of the screw, without impeding the forward progress or gripping onto the screw, and to engage interior portions of the threads of the screw only upon termination of the pushing of the screw into the mounting element.

2. A box arrangement in accordance with claim 1 wherein:

the abutment portions of the box are at acute angles with respect to the axis of the opening in the box, and the first and second retention portions are at acute angles with respect to the axis of the opening in the box.

3. A box arrangement in accordance with claim 2 wherein:

the first and second deflectible portions, including the retention portions, extend beyond the length of the opening in the box, and the abutment portions of the box are located adjacent to the rear of the opening in the box.

4. A box arrangement in accordance with claim 3 wherein:

the first and second deflectible portions are terminated by the first and second retention portions, respectively.

5. A box arrangement in accordance with claim 3 wherein:

the opening in the box is generally rectangular in shape; and the mounting element has an overall shape generally conforming to the shape of the opening in the box for preventing the mounting element from rotation within the opening in the box.

6. A box arrangement in accordance with claim 5 wherein:

the opening in the central portion of the mounting element is completely encircled by the material of the central portion, said opening defining edge portions on opposite sides thereof for abutting against portions of the box adjacent to the opening in the box.

7. A box arrangement in accordance with claim 6 wherein:

the first and second deflectible portions are terminated by the first and second retention portions, respectively.

8. A box arrangement comprising:

a box including a plurality of walls arranged to define a space for receiving a device, said box having first and second longitudinal openings therein in which first and second mounting elements are disposed, respectively, and further having first and second pairs of abutment portions adjacent to opposite sides of the first and second openings, respectively;

each of said first and second mounting elements comprising:

a central portion adjacent to the front of the corresponding opening in the box and having a portion in abutment with a portion of the box adjacent to the opening, said central portion having an opening associated therewith by which a threaded screw may be inserted into the mounting element, said opening in the central portion being of a size to permit a screw to be freely and readily inserted into the mounting element and to be pushed into the mounting element without the central portion interfering with the forward progress of the screw or gripping onto the screw;

first and second spaced-apart side portions connected with the central portion on opposite sides of the opening in the central portion and extending along the corresponding opening in the box, said side portions being spaced apart to define an unobstructed region therebetween for allowing a screw inserted into the mounting element and pushed longitudinally through the region between the side portions to pass continuously and unobstructively through the region without the side portions engaging the screw; and first and second deflectible portions respectively connected with the first and second side portions and having first and second retention portions respectively associated therewith and initially extending outwardly beyond the sides of the corresponding opening and adjacent to the abutment portions of the corresponding pair of abutment portions of the box for retaining the mounting element within the corresponding opening, said deflectible portions having threads provided along inner surfaces thereof and defining a screw-receiving region therebetween, said deflectible portions being operative when a screw is inserted and pushed longitudinally into the mounting element through the region between the side portions and into the screw-receiving region between the deflectible portions to be deflected outwardly in opposite directions away from the axis of the corresponding opening in the box and to cause the retention portions associated therewith to be positioned with respect to the abutment portions of the corresponding pair of abutment portions of the box so as to further retain the mounting element in position in the corresponding opening in the box and prevent removal of the mounting element from the corresponding opening, and the threads along the inner surfaces of the deflectible portions being operative when the screw is pushed into the screw-receiving region to ride along the rims of the threads of the screw, without impeding the forward progress or gripping onto the screw, and to engage interior portions of threads of the screw only upon termination of pushing the screw into the mounting element.

9. A box arrangement in accordance with claim 8 wherein:

the abutment portions of each of the first and second pairs of abutment portions of the box are at acute angles with respect to the axis of the corresponding opening in the box, and the first and second retention portions are at acute angles with respect to the axis of the corresponding opening in the box.

10. A box arrangement in accordance with claim 9 wherein:

the first and second deflectible portions of each of the mounting elements, including the retention portions, extend beyond the length of the corresponding opening in the box, and the abutment portions of the box are located adjacent to the rear of the corresponding opening in the box.

11. A box arrangement in accordance with claim 10 wherein:

the first and second deflectible portions of each of the mounting elements are terminated by the first and second retention portions, respectively.

12. A box arrangement in accordance with claim 11 wherein:

the first and second openings in the box are generally rectangular in shape; and the first and second mounting elements have overall shapes conforming to the shapes of the first and second openings in the box for preventing the mounting elements from rotation within the openings in the box.

13. A box arrangement in accordance with claim 12 wherein:

the openings in the central portions of the first and second mounting elements are completely encircled by the material of the central portions, said openings defining edge portions on opposite sides of the openings for abutting against portions of the box adjacent to the openings in the box.

* * * * *